(12) United States Patent
Ho

(10) Patent No.: US 7,113,089 B2
(45) Date of Patent: Sep. 26, 2006

(54) OBJECT LOCATOR STANDING ALONE OR EMBEDDED IN THE EXISTING DEVICE

(76) Inventor: Geng-Kaung Paul Ho, 1119 Grassmere Dr., Richardson, TX (US) 75080

( * ) Notice: Subject to any disclaimer, the term of this patent is extended or adjusted under 35 U.S.C. 154(b) by 128 days.

(21) Appl. No.: 11/005,539

(22) Filed: Dec. 7, 2004

(65) Prior Publication Data

US 2006/0132305 A1   Jun. 22, 2006

(51) Int. Cl.
*G08B 1/08* (2006.01)
(52) U.S. Cl. ............................ 340/539.13; 340/539.21; 340/539.11
(58) Field of Classification Search ............. 340/539.1, 340/539.11, 539.13, 539.15, 539.17, 539.21, 340/539.23, 573.4, 686.1, 10.2; 367/119
See application file for complete search history.

(56) References Cited

U.S. PATENT DOCUMENTS 5,686,902 A * 11/1997 Reis et al. ................. 340/10.2
6,504,794 B1 * 1/2003 Haase et al. ................. 367/119
6,788,199 B1 * 9/2004 Crabtree et al. ........ 340/539.13
6,826,117 B1 * 11/2004 Haase et al. ................. 367/119
7,038,584 B1 * 5/2006 Carter .................... 340/539.13
7,046,153 B1 * 5/2006 Oja et al. ................. 340/573.4

* cited by examiner

*Primary Examiner*—Van T. Trieu

(57) ABSTRACT

This invention provides an object locator to locate a variety of target objects. A selective directional transceiver is used to determine the relative direction of the target object, even in a multiple-story building, from a hand held component of the object locator. And moving the hand held component toward the target object according to the relative direction shall allow the user to quickly locate the target object. The hand held component may keep a list of identifications of multiple target objects in the memory and locate them one by one. A voice recognition unit and a key stroke recognition unit in the hand held component shall allow the user of the object locator to easily locate the object by voice and/or key stroke. To share the hardware, software, memory and the display unit of an existing device like cellular phone hand set, personal digital assistant, or car alarm remote, the object locator may be embedded in it, and expand its additional application.

18 Claims, 3 Drawing Sheets

Block diagram with external ID installation device

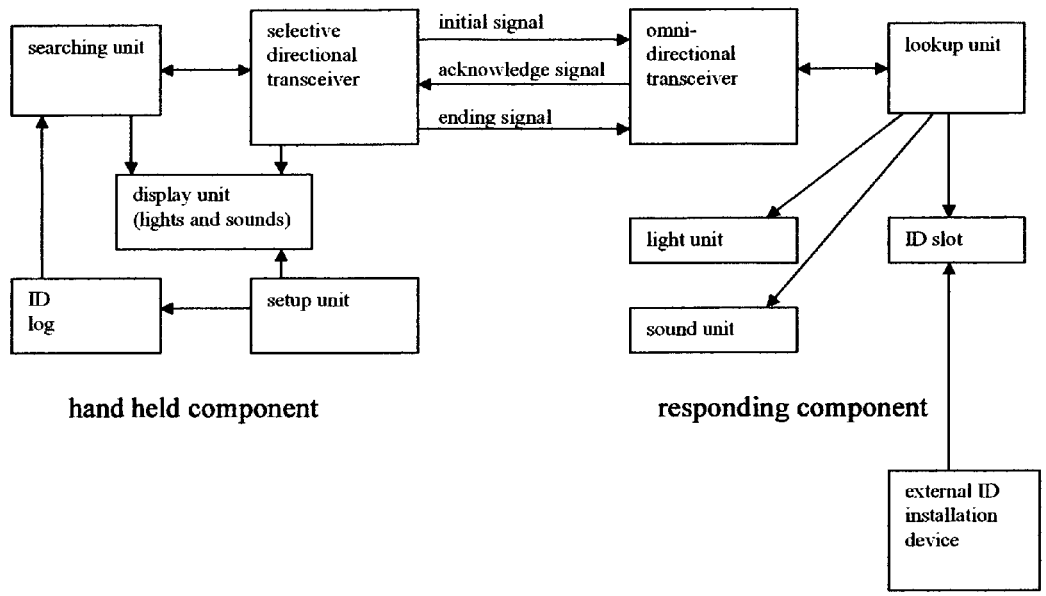
FIG. 1. Block diagram with external ID installation device
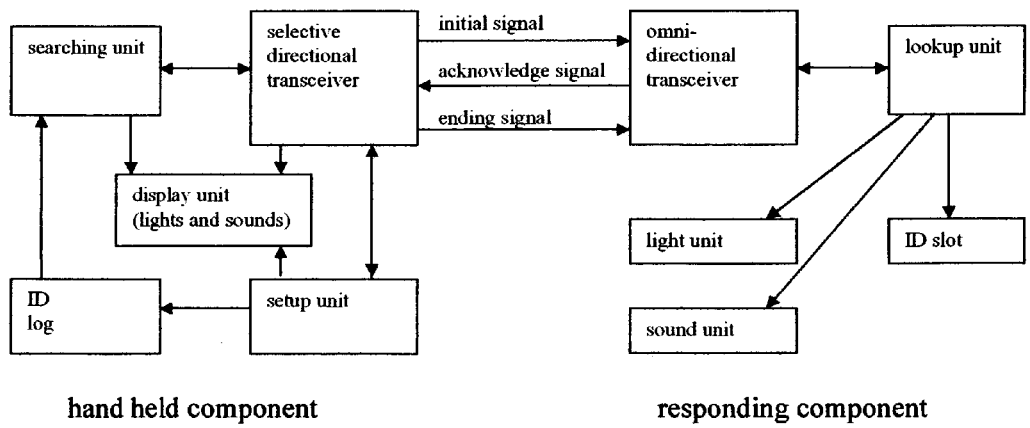
FIG. 2. Block diagram without external ID installation device

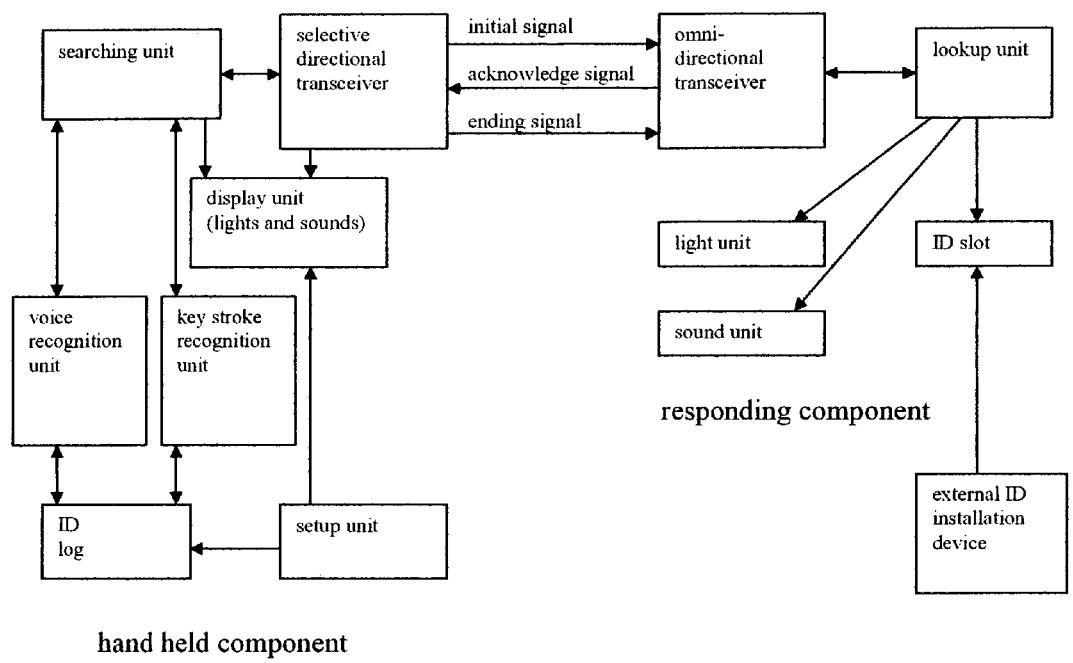
FIG. 3. Block diagram with recognition units and external ID installation device

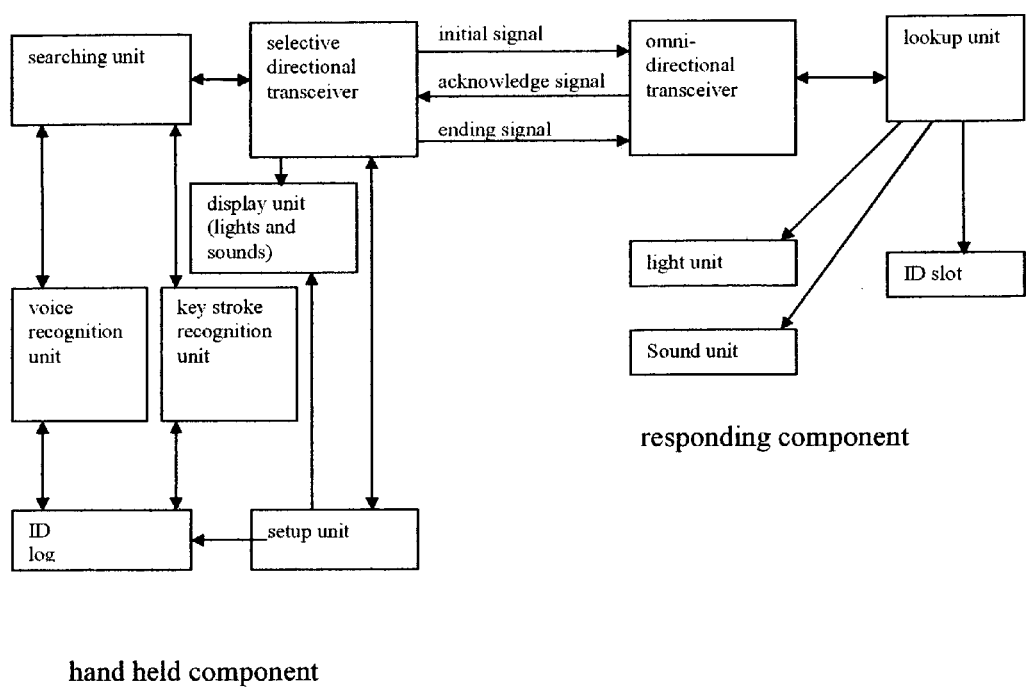
FIG. 4. Block diagram with recognize units without external ID installation device

OBJECT LOCATOR STANDING ALONE OR EMBEDDED IN THE EXISTING DEVICE

BACKGROUND OF THE INVENTION

1. Field of the Invention

This invention relates to a system for remotely providing object location.

2. Background

Vehicle locators are well known. They may be used to locate a single vehicle. However, in daily life, we need an object locator to locate a variety of the target objects in a list. Moreover, all object locators are standing alone devices. Nowadays the existing device like cellular phone set, personal digital assistant, or car alarm remote is very commonly used. We may embed the object locator in the existing device to share its hardware, software, memory and display, etc., and becomes its additional application.

The target object to be located may not necessarily be a vehicle. It may be an equipment or machine moving around and stationary, perhaps carried by a person. To locate the equipment or machine means locating the person carrying it. Using a list to keep the identification of each equipment or machine shall help us to locate a person in the list one by one.

SUMMARY OF THE INVENTION

This invention provides an object locator to locate a variety of target objects. The object locator may choose a stored identification of the target object in an identification list to locate it. The object locator consists of a responding component residing in the target object and a hand held component A searching unit of the hand held component may send, to the responding component, an initial signal including the identification of the target object with a wireless wave through a selective directional transceiver and an omni-directional transceiver of the responding component. Receiving the initial signal, if the identification matches the identification stored in the responding component, the responding component shall send an acknowledge signal with the wireless wave through the omni-directional transceiver back to the selective directional transceiver of the hand held component. The responding component may cause a series of lights, like blinking lights, and sounds based on the strength of received wireless wave. And the display unit of the hand held component shall receive the acknowledge signal from the selective directional transceiver and display the strength of the acknowledge signal. The hand held component may also cause sounds and lights based on the strength of received wireless wave.

Horizontally angular turning the selective directional transceiver toward the target object at same horizontal level shall increase the strength of the acknowledge signal. Also vertically angular turning the selective directional transceiver toward the target object at different vertical level on a building shall increase the strength of the acknowledge signal. Moving the hand held component toward the target object shall decrease the distance between the hand held component and the target object, and increase the strength of the acknowledge signal. Therefore horizontally and vertically angular turning the selective directional transceiver toward the target object and moving the hand held component toward the target object shall help the user of the object locator to locate the target object, even it is in a different level of the building with the level which the hand held component is in.

The hand held component may keep a list of identifications of multiple target objects in the memory to locate them one by one. A voice recognition unit and a key stroke recognition unit in the hand held component shall allow the user of the object locator to easily locate the object by voice and/or key stroke.

We may embed the object locater in an existing device like cellular phone set, personal digital assistant, or car alarm remote, to share its hardware, software, memory and display, etc, thus object locating expands the additional application of the existing device.

BRIEF DESCRIPTION OF THE DRAWING

The objects and others will become more apparent with reference to the appended drawings.

FIG. 1 is the block diagram of the invention, with an external ID installation device, in addition to the object locator, to install the identification of the target object to the object locater.

FIG. 2 is the block diagram of the invention, without an external ID installation device.

FIG. 3 is the block diagram adding voice recognition unit and key stroke recognition unit upon FIG. 1.

FIG. 4 is the block diagram adding voice recognition unit and key stroke recognition unit upon FIG. 2.

DESCRIPTION OF THE PREFERRED EMBODIMENT

Referring to FIG. 1, this invention provides an object locator to locate a list of target objects. Said object locator is composed of a hand held component, a responding component and an external ID installation device. Said hand held component is moving around, perhaps carried by a person, to locate a target object. Said hand held component consists of a setup unit, a searching unit, a selective directional transceiver with selective directional antenna (hereafter selective directional transceiver), an ID log, a display unit with light and sound functions. Said responding component is carried by or attached to the target object and consists of an omni-directional transceiver with omni-directional antenna (hereafter omni-directional transceiver), a lookup unit, an ID slot, a light unit and a sound unit. Said selective directional transceiver and omni-directional transceiver must work at the same frequency of wireless wave. Said external ID installation device is to write the identification into said ID slot.

Before target object locating can be done, said external ID installation device shall install said identification into said ID slot for the target object. Said external ID installation device can be an independent computer system. Short distance wireless transfer, like infrared wave, or direct connecting between said external ID installation device and said responding component may be used. The identification assignment can be done in the manufacturer's factory. To avoid accidental erasure of said ID slot of its identification, it should be made of a type of read-only memory, like ROM, PROM, EPROM, EEPROM, etc.

Said object locator can be used in a variety of applications. For instance, if the target object is a vehicle, the Vehicle Identification Number (hereafter VIN) of the vehicle can be the identification. The manufacturer of the vehicle or its vendor of said responding component may use said external ID installation device to write the VIN into said ID slot. Using said setup unit in said hand held component, the user of said object locator shall write the identification of the target object into said ID log. Said ID log may keep one or more identifications.

Referring to FIG. 2, this invention provides an object locator to locate a list of target objects. FIG. 2 is same with FIG. 1, except there is no said external ID installation device. And the identification assignment to said ID slot is done by said setup unit. Therefore, there is a two way communication between said setup unit and said selective directional transceiver.

Before target object locating, the identification assignment to said ID slot and said ID log must be done. A password is required to do so. When the password is approved, said setup unit shall assign the identification to the target object as below. Said setup unit shall send the identification of the target object to said selective directional transceiver. Said selective directional transceiver shall format a wireless wave of initial signal with the identification indicating installation process type and emit it to said omni-directional transceiver in said responding component. Upon receiving said wireless wave of initial signal, said omnidirectional transceiver shall extract said identification and said installation process type from it and send them to said lookup unit. Detecting that said initial signal is for installation process, said lookup unit then writes the identification to said ID slot and sends an acknowledge signal to said omni-directional transceiver. Said omni-directional transceiver shall format a wireless wave of acknowledge signal and send it to said selective directional transceiver. Said selective directional transceiver shall extract said acknowledge from said wireless wave of acknowledge signal and send it to said setup unit. Said setup unit then adds the identification to said ID log.

To avoid mistakenly assigning the identification to an undesired target object, the communication between two transceivers for installation may be replaced by direct connection between said hand held component and responding component. Short distance wireless transfer, like infrared wave, may be used.

For both RIG. 1 and FIG. 2, once the identification assignment is done, target object locating can be applied as below.

Said searching unit of hand held component shall choose an identification of the target object from said ID log. And send said identification to said selective directional transceiver for it to format a wireless wave of initial signal with the identification indicating the searching process type, and emit it to said omni-directional transceiver in said responding component. Upon receiving said wireless wave of initial signal, said omni-directional transceiver shall extract said identification with the searching process type from it, and send said identification with the searching process type to said lookup unit.

Upon receiving said identification with the searching process type, said lookup unit then looks up the identification from said ID slot. If the identifications match, said lookup unit shall trigger said light unit and said sound unit. Said light unit shall issue a series of lights, like blinking lights. And said sound unit shall issue a series of sounds. The lights and sounds may depend on the strength of received wireless wave. The stronger the strength, the higher frequency of blinking lights and the louder amplitude of sounds are.

Said lookup unit shall also send an acknowledge signal to said omni-directional transceiver for it to format a wireless wave acknowledge signal and send it to said selective directional transceiver. Upon receiving said wireless wave acknowledge signal, said selective directional transceiver shall extract said acknowledge signal and sent it to said display unit.

If the identification in said ID slot of said responding component was installed by said external ID installation device, said initial signal shall only consist of identification, there is no need to indicate said installation process type or said searching process type.

Upon receiving said acknowledge signal, said display unit shall convert said acknowledge signal to a visible signal indicating its strength. The light and sound shall be more frequent and louder, respectively, for stronger acknowledge signal. Since said selective directional transceiver is direction sensitive, the strength of said acknowledge signal is strongly dependent on the direction of said selective directional transceiver relative to the target object. The user may angularly turn said selective directional transceiver with said hand held component toward the direction of the target object to get the strongest said acknowledge signal. The user then moves or walks in that direction toward the target object. Thus the combination of angular turning said selective directional transceiver with said hand held component and moving toward the target object will help the user to quickly locate the target object.

Once the target object is located, the user shall stop the searching process. Said searching unit may send an ending signal to said responding component through said selective directional transceivers and said omni-directional transceiver to stop said omni-directional transceiver from emitting said wireless wave of acknowledge signal. Also said omni-directional transceiver shall notify said lookup unit to turn off said light unit and said sound unit. To stop the searching process, the user may turn off the display of said display unit. Of course, this will stop its light function and sound function. If said object locater is embedded in a device; such as cellular phone set, personal digital assistant (hereafter PDA), or car alarm remote, the device shall then be used for its other applications.

In the case that said object locator is used to locate only one target object, said ID log is not necessary. Instead said searching unit shall be installed and keep the identification of the target object.

Said object locator may be embedded in an existing device like cellular phone hand set, PDA, or car alarm remote, to share its hardware, software, memory and the display unit, etc. That way, the cellular phone hand set, PDA, or alarm remote user may carry it to locate a target object like a vehicle parked in the parking lot. We may share said selective directional antenna with the antenna of existing device. A wave shield like mesh made of metal can be added to allow said antenna to receive or emit wireless wave in selective direction when used for object locating. And a different working frequency on object locating from the frequency of the exiting applications in cellular phone hand set is desirable.

Angularly turning said selective directional transceiver may be done horizontally or vertically. For instance, the target object may be in different level of the building from the level that the user of said object locator is in. The user may horizontally turn said selective directional transceiver to determine the direction on of the target object, and then vertically turn said selective directional transceiver to determine whether the target object is on the same level or a higher or lower level of the building.

Referring to FIG. 3 and FIG. 4, a voice recognition unit including a voice accept unit (not shown) like microphone to allow the user of the object locator to use voice to locate the object. The user of the object locator may save voice signals corresponding to the identifications of the object in said ID log to said voice recognition unit through said voice accept unit. Then upon receiving one of said voice signals, said voice recognition unit shall pick up the correspondent identification from said ID log and send the identification to said searching unit for locating the object as described above. For instance, if the user saves a voice of "number 3" corresponding to an object to said voice recognize unit, then the user shall only say "number 3" to said voice accept unit to search the object.

FIG. 3 and FIG. 4, also use a key stroke recognition unit including a key pad unit (not shown) to allow the user of the object locator to use key stroke to locate the object. The user of the object locator may save key stroke signals corresponding to the identifications of the object in said ID log to said key stroke recognition unit through said key pad unit. Then, upon receiving one of said key stroke signals, said key stroke recognize unit shall pick up the correspondent identification from said ID log and send the identification to said searching unit for locating the object as described above. For instance if the user saves a key stroke signal of "5" corresponding to an object to said key stroke recognize unit, then the user shall only strike key "5", probably followed by a"#" on said key pad unit for searching the object.

I claim:

1. An object locator comprising a responding component carried by or attached to a target object, consisting of an ID slot, an omni-directional transceiver means (with omni-directional antenna), a light unit, a sound unit, a lookup unit; an external ID installation device; and a hand held component consisting of an ID log, a display unit with light and sound functions, a selective directional transceiver means (with selective directional antenna), a setup unit, a searching unit, wherein:
   A. said ID slot is to keep the identifications of the target object written by said an external ID installation device;
   B. said omni-directional transceiver means is to:
      a. receive a wireless wave of initial signal, and send the identification to said lookup unit to initiate the searching process;
      b. receive a acknowledge signal from said lookup unit and send a wireless wave of acknowledge signal to said selective directional transceiver means if the identification in said initial signal matches the identification kept in said ID slot;
      c. receive a wireless wave of ending signal and send it to said lookup unit to stop the searching process;
   C. said light unit is to issue a series of lights which may vary depending on the strength of said initial signal;
   D. said sound unit is to issue a series of sounds which may vary depending on the strength of said initial signal;
   E. said lookup unit is to:
      a. receive said identification from said omni-directional transceiver means to initiate the searching process;
      b. send said acknowledge signal to said hand held component through said omni-directional transceiver means, if said received identification matches the identification kept in said ID slot,
      c. receive said ending signal from said omni-directional transceiver means to stop said light unit and said sound unit;
      d. cause said light unit and sound unit to issue a series of lights and sounds which may vary depending on the strength of said wireless wave of initial signal;
   F. said external ID installation device, which can be an independent computer system is to write the identification of the target object to said ID slot, by short distance wireless transferal, as infrared wave, or direct connection between said external ID installation device and said responding component;
   G. said ID log is to keep one or more identifications of the target objects written by said setup unit;
   H. said display unit with functions of light and sound is to convert said acknowledge signal to a displayable signal, a series of lights and sounds according to the strength of said acknowledge signal;
   I. said selective directional transceiver means is to send said wireless wave of ending signal or said wireless wave of initial signal including the identification of the target object to said responding component, and to receive said wireless wave of acknowledge signal form said omni-directional transceiver means to trigger said display unit based on the strength of said acknowledge signal;
where in horizontal turning and vertical turning said selective directional transceiver means will locate the target objects at same horizontal level of space or even in a multiple level building;
   J. said setup unit is to set up said ID log with identifications of the target objects;
   K. said searching unit is to pick up the identification from said ID log and send it to said selective directional transceiver means for it to transfer said wireless wave of initial signal with the identification to said responding component.

2. the selective directional transceiver means of claim 1, further comprising wave shield to allow said antenna to receive or emit wireless wave in selective direction when used for object locating.

3. the hand held component of claim 1, further comprising a voice recognition means including a voice accept unit as microphone to accept the voice signal to locate the object.

4. the hand held component of claim 1, further comprising a key stroke recognition means including a key pad unit to accept the key stroke signal to locate the object.

5. An object locator embedded in a existing device as cellular phone set, personal digital assistant, or car alarm remote, to share its hardware, software, memory, thus object locating expands an additional application of said existing device, comprising a responding component carried by or attached to a target object, consisting of an ID slot, an omni-directional transceiver means (with omni-directional antenna), a light unit, a sound unit, a lookup unit; an external ID installation device; and a hand held component consisting of an ID log, a display unit with light and sound functions, a selective directional transceiver means (with selective directional antenna), a setup unit, an searching unit, wherein:
   A. said ID slot is to keep the identifications of the target object written by said an external ID installation device;
   B. said omni-directional transceiver means is to:
      a. receive a wireless wave of initial signal, and send the identification to said lookup unit to initiate the searching process;
      b. receive a acknowledge signal from said lookup unit and send a wireless wave of acknowledge signal to said selective directional transceiver means if the identification in said initial signal matches the identification kept in said ID slot;

c. receive a wireless wave of ending signal and send it to said lookup unit to stop the searching process;
C. said light unit is to issue a series of lights which may vary depending on the strength of said initial signal;
D. said sound unit is to issue a series of sounds which may vary depending on the strength of said initial signal;
E. said lookup unit is to:
   a. receive said identification from said omni-directional transceiver means to initiate the searching process;
   b. send said acknowledge signal to said hand held component through said omni-directional transceiver means, if said received identification matches the identification kept in said ID slot,
   c. receive said ending signal from said omni-directional transceiver means to stop said light unit and said sound unit;
   d. cause said light unit and sound unit to issue a series of lights and sounds which may vary depending on the strength of said wireless wave of initial signal;
F. said external ID installation device, which can be an independent computer system is to write the identification of the target object to said ID slot, by short distance wireless transferal, as infrared wave, or direct connection between said external ID installation device and said responding component;
G. said ID log is to keep one or more identifications of the target objects written by said setup unit;
H. said display unit with functions of light and sound is to convert said acknowledge signal to a displayable signal, a series of lights and sounds according to the strength of said acknowledge signal;
I. said selective directional transceiver means is to send said wireless wave of ending signal or said wireless wave of initial signal including the identification of the target object to said responding component, and to receive said wireless wave of acknowledge signal form said omni-directional transceiver means to trigger said display unit based on the strength of said acknowledge signal;
where in horizontal turning and vertical turning said selective directional transceiver means will locate the target objects at same horizontal level of space or even in a multiple level building;
J. said setup unit is to set up said ID log with identifications of the target objects;
K. said searching unit is to pick up the identification from said ID log and send it to said selective directional transceiver means for it to transfer said wireless wave of initial signal with the identification to said responding component.

6. the selective directional transceiver means of claim 2, further comprising wave shield to allow said antenna to receive or emit wireless wave in selective direction when used for object locating.

7. the selective directional transceiver means and omni-directional transceiver means of claim 5 further using working frequency on object locating which is different from the frequency of the exiting applications in cellular phone hand set.

8. the hand held component of claim 5, further comprising a voice recognition means including a voice accept unit as microphone to accept the voice signal to locate the object.

9. the hand held component of claim 5, further comprising a key stroke recognition means including a key pad unit to accept the key stroke signal to locate the object.

10. An object locator comprising an a hand held component consisting of an ID log, a display unit with light and sound functions, a selective directional transceiver means (with selective directional antenna), a setup unit, a searching unit; and a responding component carried by or attached to the target, consisting of an ID slot, an omni-directional transceiver means (with omni-directional antenna), a light unit, a sound unit, a lookup unit; wherein:
A. said ID log is to keep one or more identifications of the target objects written by said setup unit;
B. said display unit with functions of light and sound is to convert the acknowledge signal to a displayable signal, a series of lights and sounds according to the strength of said acknowledge signal;
C. said selective directional transceiver means is to:
   a. to receive the identification from said setup unit or searching unit, and to format an initial signal with the identification of the target object and send wireless wave of it to said omni-directional transceiver means, to initiate the installation process or the searching process;
   b. to receive wireless wave of said acknowledge signal from said omni-directional transceiver means of responding component and send said acknowledge signal to said display unit and trigger it;
wherein horizontal turning and vertical turning said selective directional transceiver means will help to locate the target objects at same horizontal level of space or even in a multiple level building;
   c. send a wireless wave of ending signal to said omni-directional transceiver means to stop the searching process;
D. said setup unit is to write identifications of the target objects to said ID log and said ID slot;
E. said searching unit is to pick up the identification from said ID log and send it to said selective directional transceiver means for formatting a wireless wave of initial signal for installation process or searching process and transfer it to said responding component;
F. said ID slot is to keep the identifications of the target object, installed by said setup unit;
G. said an omni-directional transceiver means is to:
   a. receive wireless wave of said initial signal with identification and installation process type or searching process type, and send it to said lookup unit to start installation process or searching process;
   b. receive said acknowledge signal from said lookup unit and send said wireless wave of acknowledge signal to said selective directional transceiver;
   c. receive a wireless wave of said ending signal and send it to said lookup unit to stop the searching process;
H. said light unit is to issue a series of lights which may vary depending on the strength of said wireless wave with initial signal;
I. said sound unit is to issue a series of sounds which may vary depending on the strength of said wireless wave of initial signal;
J. said lookup unit is to:
   a. write said identification in said initial signal of installation process received from said omni-directional transceiver means to said ID slot;
   b. compare the identification in said initial signal of searching process received from said omni-directional transceiver means with the identification kept in the ID slot, and send wireless wave of said acknowledge signal to said hand held component through said omni-directional transceiver means, if both said identifications match each other;

c. receive said ending signal from said omni-directional transceiver means to stop said light unit and said sound unit;

d. cause said light unit and sound unit to issue a series of lights and sounds which may vary depending on the strength of said initial signal.

11. the selective directional transceiver means of claim 10, further comprising wave shield to allow said antenna to receive or emit wireless wave in selective direction when used for object locating.

12. the hand held component of claim 10, further comprising a voice recognition means including a voice accept unit as microphone to accept the voice signal to locate the object.

13. the hand held component of claim 10, further comprising a key stroke recognition means including a key pad unit to accept the key stroke signal to locate the object.

14. An object locator embedded in a existing device as cellular phone set, personal digital assistant, or car alarm remote to share its hardware, software, memory and the display unit, thus object locating expands as an additional application of said existing device, comprising an a hand held component consisting of an ID log, a display unit with light and sound functions, a selective directional transceiver means (with selective directional antenna), a setup unit, a searching unit; and a responding component carried by or attached to a target, consisting of an ID slot, an omni-directional transceiver means (with omni-directional antenna), a light unit, a sound unit, a lookup unit; wherein:

A. said ID log is to keep one or more identifications of the target objects written by said setup unit;

B. said display unit with functions of light and sound is to convert the acknowledge signal to a displayable signal, a series of lights and sounds according to the strength of said acknowledge signal;

C. said selective directional transceiver means is to:
  a. to receive the identification from said setup unit or searching unit, and to format an initial signal with the identification of the target object and send wireless wave of it to said omni-directional transceiver means, to initiate the installation process or the searching process;
  b. to receive wireless wave of said acknowledge signal from said omni-directional transceiver means of responding component and send said acknowledge signal to said display unit and trigger it;
wherein horizontal turning and vertical turning said selective directional transceiver means will help to locate the target objects at same horizontal level of space or even in a multiple level building;
  c. send a wireless wave of ending signal to said omni-directional transceiver means to stop the searching process;

D. said setup unit is to write identifications of the target objects to said ID log and said ID slot;

E. said searching unit is to pick up the identification from said ID log and send it to said selective directional transceiver means for formatting a wireless wave of initial signal for installation process or searching process and transfer it to said responding component;

F. said ID slot is to keep the identifications of the target object, installed by said setup unit;

G. said an omni-directional transceiver means is to:
  a. receive wireless wave of said initial signal with identification and installation process type or searching process type, and send it to said lookup unit to start installation process or searching process;
  b. receive said acknowledge signal from said lookup unit and send said wireless wave of acknowledge signal to said selective directional transceiver;
  c. receive a wireless wave of said ending signal and send it to said lookup unit to stop the searching process;

H. said light unit is to issue a series of lights which may vary depending on the strength of said wireless wave with initial signal;

I. said sound unit is to issue a series of sounds which may vary depending on the strength of said wireless wave of initial signal;

J. said lookup unit is to:
  a. write said identification in said initial signal of installation process received from said omni-directional transceiver means to said ID slot;
  b. compare the identification in said initial signal of searching process received from said omni-directional transceiver means with the identification kept in the ID slot, and send wireless wave of said acknowledge signal to said hand held component through said omni-directional transceiver means, if both said identifications match each other;
  c. receive said ending signal from said omni-directional transceiver means to stop said light unit and said sound unit;
  d. cause said light unit and sound unit to issue a series of lights and sounds which may vary depending on the strength of said initial signal.

15. the selective directional transceiver means of claim 14, further comprising wave shield to allow said antenna to receive or emit wireless wave in selective direction when used for object locating.

16. the selective directional transceiver means and omni-directional transceiver means of claim 14 further using working frequency on object locating which is different from the frequency of the exiting applications in cellular phone hand set.

17. the hand held component of claim 14, further comprising a voice recognition means including a voice accept unit as microphone to accept the voice signal to locate the object.

18. the hand held component of claim 14, further comprising a key stroke recognition means including a key pad unit to accept the key stroke signal to locate the object.

* * * * *